Figure 1:
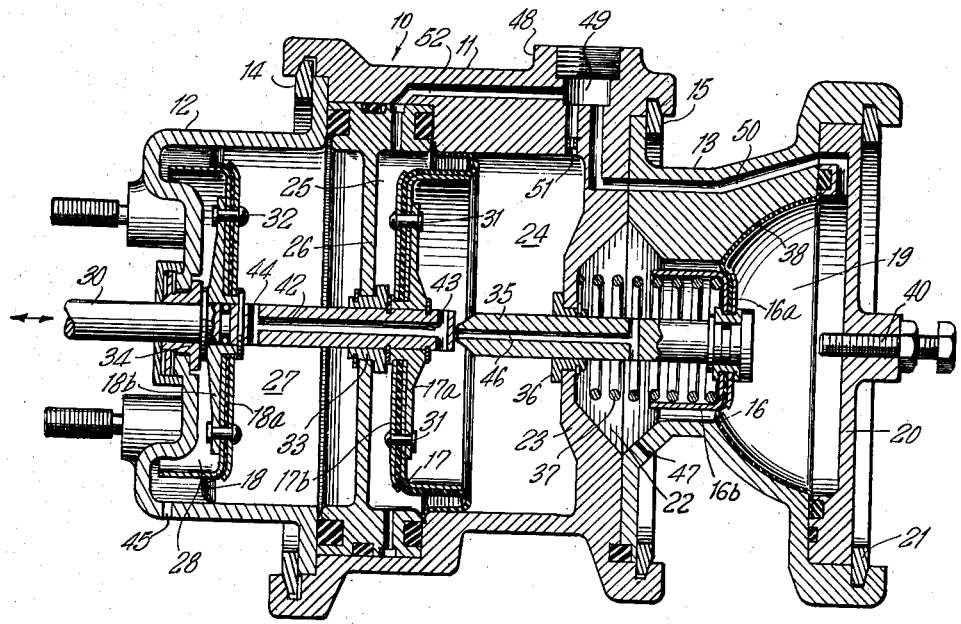

March 14, 1961     T. LINDBOM ET AL     2,974,640
PRESSURE CONTROLLED ACTUATOR
Filed Nov. 21, 1957

INVENTORS
TORSTEN LINDBOM
WALTER H. RUCKS

BY Brumbaugh, Free, Graves & Donohue

ATTORNEYS

United States Patent Office 2,974,640
Patented Mar. 14, 1961

2,974,640
PRESSURE CONTROLLED ACTUATOR

Torsten Lindbom, Blue Point, and Walter H. Rucks, Islip, N.Y., assignors to Fairchild Engine and Airplane Corporation, Hagerstown, Md., a corporation of Maryland Filed Nov. 21, 1957, Ser. No. 697,887

11 Claims. (Cl. 121—41)

This invention relates to pressure controlled actuators generally and, more particularly, to a pressure controlled actuator wherein at lower pressures of the control fluid smaller variations thereof will produce greater displacement of the actuator means than the same variations at higher pressure.

In certain control systems, non-linear relationships exist between the movements of controlled parts and the pressures of fluids which are available to control the operation of actuators employed to impart the desired movements to the controlled parts. For example, in the control of certain turbines, it is desirable to provide for the adjustment of the nozzle area in the inlet of the turbine as a non-linear function of the turbine inlet pressure. The present invention provides an actuator which is especially suited to achieve this result.

The pressure controlled actuator of the present invention includes a dominant or control section and a servient or controlled section. The control section includes a movable diaphragm which is acted on by three forces in balance, namely, the forces produced by the control pressure, by the ambient or atmospheric pressure, and by a spring. The servient section includes a movable diaphragm acted on by three forces in balance, namely, the forces produced by the control pressure, by the ambient or atmospheric pressure, and by a working pressure which is the pressure within a chamber into which the control fluid is bled through a restriction and from which the fluid is bled to atmosphere at a variable rate of flow. In the control section, the position of the movable diaphragm determines the position of a control element containing a passage through which fluid is bled to atmosphere. In the servient section, the position of the movable diaphragm determines the position of a valve element which controls the rate of flow of said fluid through the passage of the control element. It is this rate of flow which, in part, determines the working pressure.

When the system is in equilibrium, the control element and the valve element are closely spaced so that there is but a small bleed of fluid to atmosphere through the passage of the control element. If the control pressure increases, the valve and the control element are brought together, reducing or cutting off entirely the bleed to atmosphere until the working pressure builds up sufficiently to reestablish said bleed. If, on the other hand, the control pressure decreases, the control element is displaced away from the valve element and the rate of bleed to atmosphere through the passage thereof increases, producing a displacement of the valve element toward the control element until equilibrium is again established. In each case, the displacement of the valve element is transmitted through a mechanical connection or linkage to the part whose operation is to be controlled. Therefore, the adjusted position of the valve element, and hence also of the part controlled by the actuator, is determined by the position of the control element.

In the pressure controlled actuator of the present invention, for each adjusted position of the control element there is a corresponding position of the valve element and, therefore, of the part to be controlled by the actuator. However, increasing increments in the control pressure are required to produce given increments of displacement of the control element. This is achieved in the present invention by employing in the control section either a variable area diaphragm in combination with a spring having linear characteristics, or a constant area diaphragm in combination with a spring having non-linear characteristics.

Figure 2:
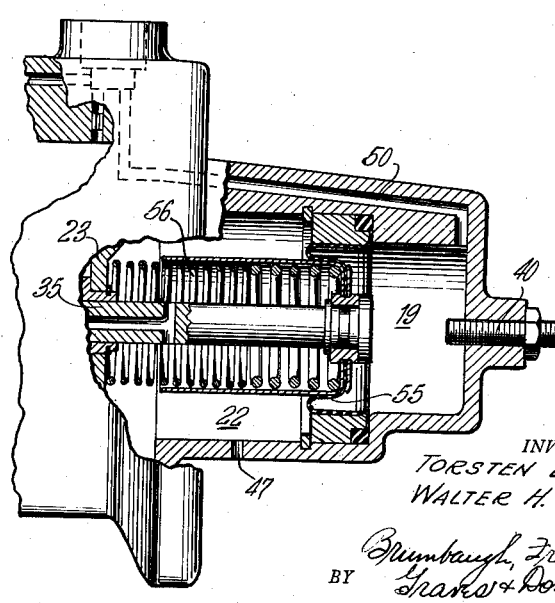

For a complete understanding of the present invention, reference may be made to the detailed description which follows, and to the accompanying drawings in which:

Figure 1 is a longitudinal cross-sectional view of an actuating device embodying the present invention; and Figure 2 is a fragmentary view, partly in cross-section, of an alternative embodiment of the present invention.

Referring to Figure 1 of the drawings, the housing, generally designated 10, of the actuating device includes an intermediate section 11 and end sections 12 and 13 connected to the intermediate section 11 by spring clips 14 and 15, respectively. The interior of the housing 10 contains three movable diaphragms 16, 17 and 18. A chamber 19 is defined to the right of the diaphragm 16 between the wall of the diaphragm and a disk 20 which serves as an end wall of the housing. The disk 20 is locked in place by a spring clip 21. A chamber 22 is defined to the left of the diaphragm 16 between the diaphragm and a partition wall 23 which is part of the intermediate housing section 11. A chamber 24 is defined between the partition wall 23 and the right side of the diaphragm 17. A chamber 25 is defined between the left side of the diaphragm 17 and a partition wall 26. A chamber 27 is defined between the partition wall 26 and the right side of the diaphragm 18. Finally, a chamber 28 is defined between the diaphragm 18 and the end wall of the housing section 12.

An actuating rod 30 is connected to the movable diaphragms 17 and 18. More specifically, rigid members 17a and 17b are held in engagement with opposite sides of the diaphragm 17 by rivets 31. Also, rigid members 18a and 18b are held in engagement with opposite sides of the diaphragm 18 by rivets 32. The rigid members 17a and 18b are affixed to the actuating rod 30.

The actuating rod 30 passes through suitable openings in the partition wall 26 and in the end wall of the housing section 12. The actuating rod is connected to the part to be controlled (not shown), and the axial displacement of the actuating rod imparts the desired movement for the adjustment of the part. The actuating rod 30 is guided for axial movement relative to the housing by guide bushings 33 and 34 which also serve as effective seals to prevent leakage of the fluid therethrough.

A control rod 35 is guided for axial displacement by a bushing 36 in the partition wall 23. One end of the control rod 35 is affixed to a rigid plate 16a on one side of the diaphragm 16 and to a spring retaining member 16b on the other side of the diaphragm. The spring retaining member 16b engages one end of a compression spring 37 which is accommodated within the chamber 22. The opposite end of the spring 37 engages the wall 23. The limits of movement of the control rod 35 are determined in one direction by abutment with an adjustable set screw 40 in the end wall or disk 20 of the housing section 13, and in the other direction by abutment with the end of the actuating rod 30.

The pressure within the chamber 19 acts against the diaphragm 16 and forces it against a concave surface 38 of the housing section 13. When the control rod is in its extreme rightward position in engagement with the set screw 40, only the outer periphery of the diaphragm 16 is in engagement with the surface 38. Therefore, in this position the effective surface area of the diaphragm 16 is at its maximum. As the control rod 35 moves to the left, a greater peripheral portion of the diaphragm 16 moves into abutment with the surface 38, thereby reducing the effective surface area of the diaphragm.

In the drawing, the actuating rod 30 is shown in its extreme leftward position, with the plates 17b and 18b in engagement with the bushings 33 and 34. The extreme rightward position of the actuating rod 30 is determined by engagement with the end of the control rod 35.

The actuating rod 30 is formed with an axial passage 42 therethrough which terminates in radial passages 43 and 44. This passage establishes communication between the chambers 24 and 27, so that the pressures in the chambers 24 and 27 are equalized. The chamber 28 is in communication with ambient or atmospheric pressure through an opening 45.

The control rod 35 contains an axial passage 46 therethrough which connects the chambers 22 and 24. The chamber 22 is in communication with the ambient or atmospheric pressure through an opening 47 in the housing.

The upper portion of the housing 10 is provided with an upstanding boss 48 containing an inlet passage 49 therethrough. This inlet passage is threaded to permit the passage to be connected with the source of fluid which is to serve as the control pressure for the actuator. This inlet passage 49 is in communication with the chamber 19 through a passage 50, with the chamber 24 through a restricted passage 51, and with the chamber 25 through a passage 52. Thus, the control pressure with which the inlet passage 49 is in communication is exerted on the diaphragm 17 from the chamber 25 and on the diaphragm 16 from the chamber 19. The working pressure, that is to say, the pressure within the chambers 24 and 27, is that pressure which is admitted from the inlet passage 49 through the restricted passage 51 and is influenced by the controlled rate of bleed of the fluid to atmosphere through the passage 46 of the control rod.

The actuator of the present invention consists of a control section and a servient section. In the control section of the actuator, the position of the control rod 35 is determined by the pressure within the chamber 19 acting against one side of the diaphragm 16, and by the pressure exerted by the spring 37 and the atmospheric pressure within the chamber 22 acting against the opposite side of the diaphragm 16. In the servient section of the actuator, the position of the actuating rod 30 is determined by the pressure within the chambers 24 and 27 acting against corresponding sides of the diaphragms 17 and 18, by the control pressure within the chamber 25 acting against the opposite side of the diaphragm 17, and by the atmospheric pressure within the chamber 28 acting against the opposite side of the diaphragm 18. The pressures within the chambers 22 and 28 exert equal effects on the control rod 35 and the actuating rod 30, respectively, so that they have no tendency to move these rods relatively to each other.

In the control part of the actuator, the control pressure is transmitted to the chamber 19 and acts against the diaphragm 16. Since the opposite side of the diaphragm 16 is vented to atmosphere and acted on by a spring 37 which has linear characteristics, the net force exerted on the diaphragm is a function of the diaphragm area and the control pressure. When the control pressure is relatively constant and the device is in equilibrium, the extreme end of the actuating rod 30 is closely spaced to the end of the control rod 35 and serves as a valve element to regulate the flow of fluid from the chamber 24 through the passage 46 to the chamber 22 which is at atmospheric pressure. The pressure in the chamber 19 varies in response to changes in the control pressure, and the resulting movement of the diaphragm 16 displaces the control rod 35 toward or away from the extreme end of the actuating rod 30.

The chambers 24 and 27 are at the same pressure, since they are interconnected by the passage 42 through the actuating rod 30. These chambers experience an intermediate pressure which is referred to herein as the "working" pressure. The working pressure is always less than the control pressure and greater than atmospheric pressure. The value of the working pressure depends upon the magnitude of the forces to be overcome in order to move the actuating rod 30 to transmit movement to the control part.

The pressure within the chambers 24 and 27 originates as control pressure, but drops in flowing through the restricted passage 51 and depends upon the rate of bleed to atmosphere through the passage 46 of the control rod. The rate of bleed, in turn, depends on the size of the gap between the actuating rod and the end of the control rod, since the end of the actuating rod within the chamber 24 has a valve action on the flow of fluid from the chamber 24 through the passage 46. In the position of equilibrium, the width of this gap is less than a few thousandths of an inch or, in other words, of the same order of magnitude as the effective size of the restricted passage 51. At equilibrium, the pressure within the chambers 24 and 27 is thus controlled to be about one-half of the control pressure at the inlet passage 49.

When the actuating rod 30 of the actuator is in a given position of adjustment, the actuator is capable of developing appreciable forces to overcome changes in the load on the actuating rod. For example, if the forces acting on the controlled part which is connected to the actuating rod 30 cause a movement of the actuating rod to the left as viewed in Figure 1, the end of the actuating rod 30 is displaced from the end of the control rod 35, resulting in a decrease in the working pressure in the chambers 24 and 27. This decrease in working pressure results from the fact that the outflow through the passage 46 tends to be greater than the inflow through the restricted passage 51 until equilibrium is established at a lower pressure level. As the working pressure within the chambers 24 and 27 decreases, the force exerted by the pressure in the chamber 27 tending to move the diaphragm 18 to the left against atmospheric pressure is reduced; similarly, the force exerted by the pressure in the chamber 25 tending to move the diaphragm 17 to the right increases as a result of the difference between the control pressure and the working pressure. The net effect is a corrective force to return the actuating rod to the right so that the gap between the actuating rod and the control rod is reduced and the bleed-off of the working pressure is corrected.

Similarly, if the forces on the controlled part tend to displace the actuating rod to the right, the actuating rod abuts against the end of the control rod, reducing or cutting off entirely the bleed of fluid from the chamber 24 to the chamber 22 via the passage 46. Since the outflow from the chamber 24 is reduced or stopped, the pressure within the chamber 24 builds up, so that the net force on the diaphragms 17 and 18 to the left increases.

Although the foregoing forces are developed to maintain the actuating rod 30 in a given position of adjustment notwithstanding variations in the load forces, the actuating rod is adapted to be displaced in response to variations in the control pressure. For example, in the event of an increase in the control pressure, the pressure within the chamber 19 is increased, moving the control rod toward or into engagement with the end of the actuating rod 30, thereby reducing or cutting off the bleed from the chambers 24 and 27 through the passage 46. This action, as explained above, builds up the pressure within the chamber 24, moving the diaphragms 17 and 18 to the left as viewed in Figure 1, displacing the actuating rod to the left until a position of equilibrium is restored. Likewise, when the control pressure decreases, the control rod 35 moves to the right, resulting in a movement of the actuating rod 30 to the right. Thus, the position of the control rod 35 determines at all times the position of the actuating rod 30.

Due to the fact that the effective area of the diaphragm 16 depends upon the pressure within the chamber 19, the actuator is designed so that greater increments of pressure are required to obtain a given displacement of the actuating rod at higher pressures, and smaller increments of pressure are required to produce a given displacement of the actuating rod 30 at lower pressures. This desired action is achieved in the actuator described herein by providing a modulated displacement of the control rod for different pressures of the control fluid. More specifically, when the pressure within the chamber 19 is reduced in response to a decrease in the control pressure, the compression spring 37 displaces the diaphragm 16 to the right as viewed in Figure 1, thereby moving a peripheral portion of the diaphragm out of contact with the concave wall 38 of the housing. The effective surface area of the diaphragm 16 is thereby increased. On the other hand, when the pressure within the chamber 19 increases due to an increase in the control pressure, the diaphragm is displaced to the left, as viewed in Figure 1, against the action of the spring 37, moving a peripheral portion of the diaphragm into engagement with the wall 38. The effective surface area of the diaphragm is thereby reduced. Therefore, a greater linear displacement of the control rod 35 will result from given increments in the pressure of the control fluid at relatively low pressures and smaller linear displacement will result from given increments in the pressure of the control fluid at relatively high pressures.

The embodiment illustrated in Figure 2 of the drawing is identical to the embodiment illustrated in Figure 1, except that the means for modulating the displacement of the control element 35 so that for given increments of pressure change the amount of displacement is greater at low control pressures than at high control pressures includes a constant area diaphragm 55 in combination with a spring 56 having non-linear characteristics.

The invention has been shown in preferred forms and by way of example only, and obviously many variations and modifications may be made therein without departing from the spirit of the invention. The invention, therefore, is not to be limited to any specified form or embodiment, except in so far as such limitations are set forth in the claims.

We claim:

1. A pressure controlled actuator including a control mechanism and a servient mechanism, the control mechanism comprising a displaceable control element, the position of which is influenced by a control pressure, and the servient mechanism comprising a displaceable servient element relatively movable with respect to the control element, actuator means connected to the servient element, means defining a pressure chamber in communication with said control pressure, the pressure within said chamber influencing the position of said servient element, means defining a bleed passage through one of said elements for exhausting the fluid from the chamber which influences the position of the servient element, variable valve means determining the rate of bleed of said fluid from said chamber, said valve means being controlled by the relative positions of said servient and control elements, and means in communication with the control pressure for influencing the position of the control element.

2. A pressure controlled actuator including a control mechanism and a servient mechanism, the servient mechanism comprising a displaceable servient element, means defining a chamber, the pressure of which influences the position of said displaceable servient element, means defining a passage in communcation with a control fluid for admitting a control fluid under pressure into said chamber, means defining a passage through which fluid is exhausted from said chamber, the control mechanism comprising a displaceable control element, means defining a chamber, the pressure of which influences the position of the control element, and means defining a passage in communication with a control pressure for admitting the control fluid under pressure into said chamber associated with the control mechanism, the exhaust passage from the chamber associated with the servient mechanism being formed through said control element, whereby the gap between the said servient element and the said control element determines the rate of bleed of said fluid from the chamber associated with the servient mechanism.

3. A pressure controlled actuator including a control mechanism and a servient mechanism, the servient mechanism comprising a movable diaphragm, a flow regulating means carried by said diaphragm, means defining a chamber adjacent one side of said diaphragm, and means defining a restricted passage communicating with a control pressure through which fluid is admitted into said chamber, and the control mechanism comprising a control element, the position of which is influenced by the control pressure, and means defining a passage in said control element for bleeding said fluid from said chamber associated with the servient mechanism, the position of the control element relative to said flow regulating means determining the rate of bleed of said fluid from said chamber.

4. A pressure controlled actuator as set forth in claim 3 including means controlled by variations in the control pressure for displacing the control element variable increments for given variations in the pressure of the fluid at different magnitudes of the control pressure.

5. A pressure controlled actuator as set forth in claim 4 in which the control element is displaced greater distances at low magnitudes of the control pressure and smaller distances at greater magnitudes of the control pressure.

6. A pressure controlled actuator as set forth in claim 4 wherein said means controlled by variations in the control pressure comprises a movable diaphragm, a spring having linear characteristics acting against said movable diaphragm, and means adjacent the diaphragm for varying the effective area of the diaphragm.

7. A pressure controlled actuator as set forth in claim 4 wherein the means controlled by variations in the control pressure comprises a movable diaphragm, and a spring having variable characteristics acting against the movable diaphragm.

8. A pressure controlled actuator comprising a housing, a movable actuating rod guided for axial movement within said housing, a movable diaphragm connected to said actuating rod for imparting movement thereto, means defining first and second chambers on opposite sides of said diaphragm, means defining a passage connecting said first chamber with a control fluid under pressure, means defining a restricted passage connecting said second chamber with said control fluid, an axially movable control rod arranged in tandem with said actuating rod, a passage through said control rod which communicates with the atmosphere, whereby fluid from said second chamber is bled to atmosphere, opposite ends of the actuating rod and the control rod cooperating to regulate the flow of fluid from said second chamber through said passage in the control rod to atmosphere, and means controlled by the control pressure for displacing the control rod as a non-linear function of the control pressure, said displacement being greater for given variations in the control pressure at low magnitudes of the control pressure and smaller for given variations in the control pressure at greater magnitudes of the control pressure.

9. A pressure controlled actuator including a control mechanism and a servient mechanism, the control mechanism comprising a displaceable control element, the position of which is influenced by a control pressure, and the servient mechanism comprising a displaceable servient element, means defining a pressure chamber in communication with said control pressure, the pressure within said chamber influencing the position of said displaceable servient element, means defining a bleed passage for exhausting the fluid from the chamber, variable valve means determining the rate of bleed of said fluid from said chamber, said valve means being controlled by the relative positions of said servient and control elements, means in communication with the control pressure for influencing the position of the control element, and means for modulating the displacement of the control element so that for given increments of pressure change the amount of displacement is greater at low control pressures than at high control pressures.

10. A pressure controlled actuator as set forth in claim 9 wherein said modulating means includes movable means having a surface thereof in communication with said control pressure, biasing means acting on said movable means in opposition to the control pressure, and means for varying the effective area of said surface in communication with said control pressure at different magnitudes of the control pressure.

11. A pressure controlled actuator as set forth in claim 9 wherein said modulating means includes movable means in communication with said control pressure, and biasing means having non-linear characteristics acting on said movable means in opposition to the control pressure.

References Cited in the file of this patent

UNITED STATES PATENTS

| | | |
|---|---|---|
| 2,264,262 | Erbguth | Nov. 25, 1941 |
| 2,406,181 | Wiegand | Aug. 20, 1946 |
| 2,411,747 | Nelson | Nov. 26, 1946 |
| 2,411,748 | Keiley | Nov. 26, 1946 |
| 2,558,506 | Annin | June 26, 1951 |
| 2,575,085 | Alyea | Nov. 13, 1951 |
| 2,653,578 | Moore | Sept. 29, 1953 |
| 2,728,231 | Blair | Dec. 27, 1955 |
| 2,755,812 | Garnett | July 24, 1956 |
| 2,789,543 | Popowsky | Apr. 23, 1957 |
| 2,914,077 | Grogan | Nov. 24, 1959 |